(12) United States Patent (10) Patent No.: US 7,584,054 B2
Wilcox et al. (45) Date of Patent: Sep. 1, 2009

(54) SYSTEM AND METHOD FOR DISPLAYING STORM TRACKS

(75) Inventors: Sherman L. Wilcox, Huntsville, AL (US); Robert O. Baron, Sr., Huntsville, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

(21) Appl. No.: 11/867,191

(22) Filed: Oct. 4, 2007

(65) Prior Publication Data

US 2008/0065329 A1 Mar. 13, 2008

Related U.S. Application Data

(63) Continuation-in-part of application No. 11/404,392, filed on Apr. 14, 2006.

(60) Provisional application No. 60/671,240, filed on Apr. 14, 2005.

(51) Int. Cl.
 *G01W 1/00* (2006.01)
(52) U.S. Cl. ......................................................... 702/3
(58) Field of Classification Search ...................... 702/3
 See application file for complete search history.

(56) References Cited

U.S. PATENT DOCUMENTS

| 5,379,215 | A | | 1/1995 | Kruhoeffer et al. |
| 5,517,193 | A | * | 5/1996 | Allison et al. ............ 342/26 R |
| 5,717,589 | A | | 2/1998 | Thompson et al. |
| 6,125,328 | A | | 9/2000 | Baron et al. |
| 6,188,960 | B1 | | 2/2001 | Baron et al. |
| 6,339,747 | B1 | | 1/2002 | Daly et al. |
| 2003/0206182 | A1 | | 11/2003 | Kelly et al. |
| 2004/0243533 | A1 | | 12/2004 | Dempster et al. |
| 2006/0100912 | A1 | * | 5/2006 | Kumar et al. .................. 705/4 |

* cited by examiner

*Primary Examiner*—Bryan Bui
*Assistant Examiner*—Jonathan Teixeira Moffat
(74) *Attorney, Agent, or Firm*—Bradley Arant Boult Cummings LLP; Stephen H. Hall; Jeremy A. Smith

(57) ABSTRACT

A system and method for displaying storm tracks is provided. The method includes combining topographic imagery, preferably high-resolution photographic images, with storm path vectors. The method further includes panning along the storm path vector, in a "zoomed-in" mode, to allow site-specific depiction of geographic landmarks and expected times of arrival. A system for performing the method includes control logic which causes a computer system to execute the steps of the method is also provided.

8 Claims, 7 Drawing Sheets

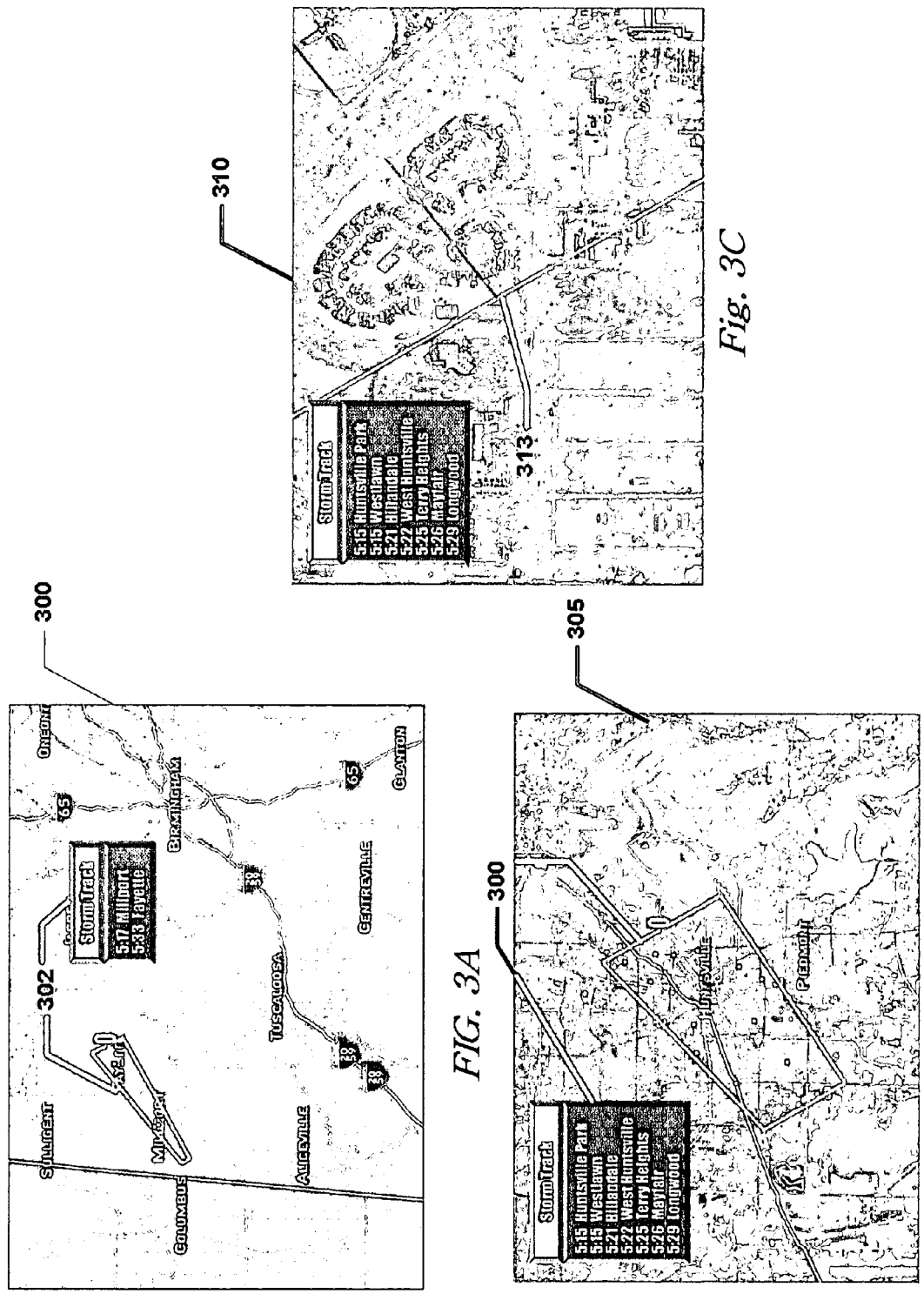

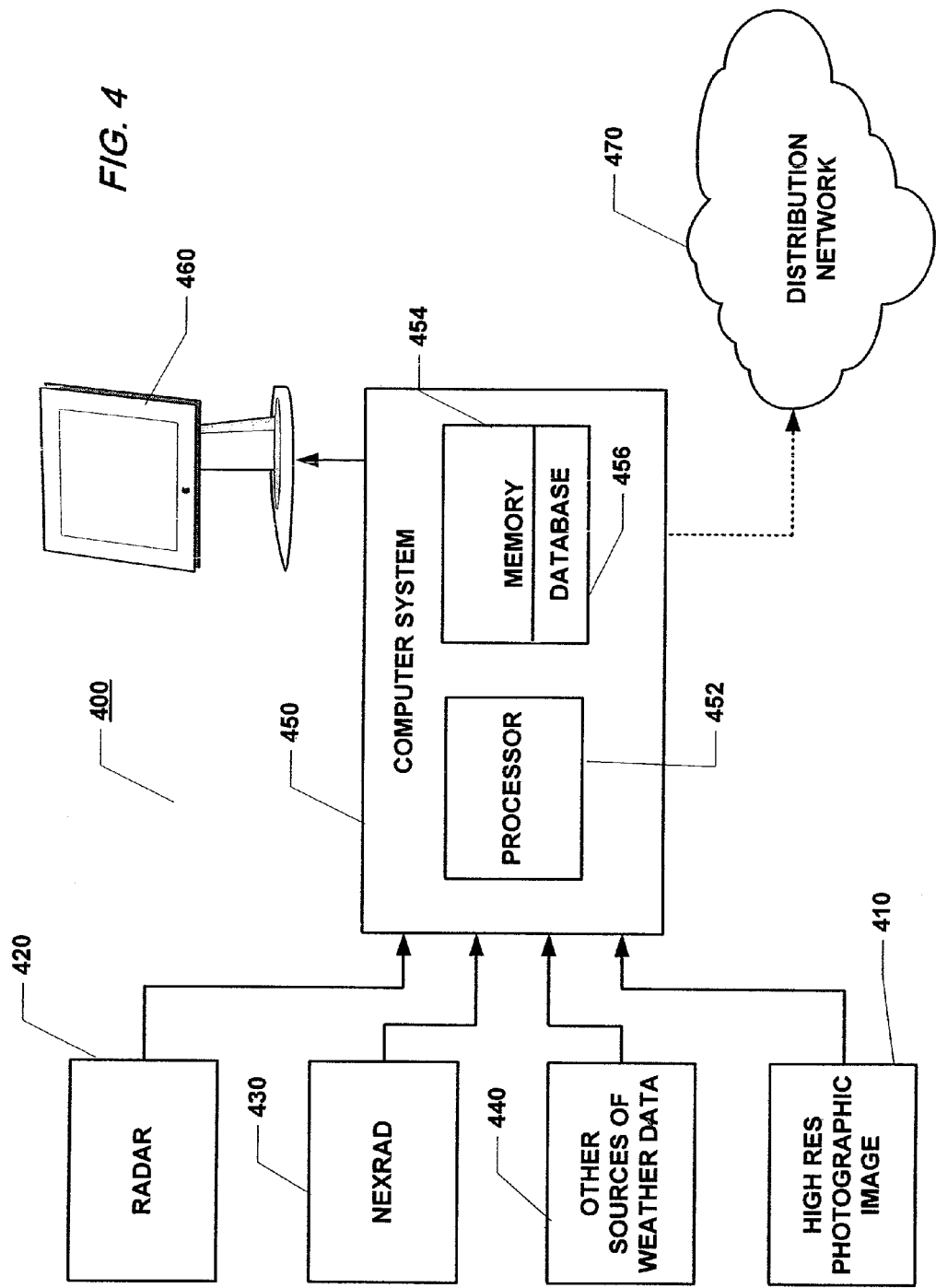

SYSTEM AND METHOD FOR DISPLAYING STORM TRACKS

CROSS-REFERENCE TO RELATED APPLICATIONS

This non-provisional application is a continuation-in-part of, and claims priority to, and the benefit of, U.S. Nonprovisional application Ser. No. 11/404,392, filed Apr. 14, 2006, which claims priority to U.S. Provisional App. Ser. No. 60/671,240, filed Apr. 14, 2005, both of which are incorporated by reference herein.

FIELD OF THE INVENTION

The present invention relates to the display of weather symbology upon high-resolution photographic images and topographical imagery, and more particularly, to a system and method for displaying storm tracks, panning along the storm path advancing in time, on high-resolution images and other topographical imagery.

BACKGROUND

High resolution images are beneficial for showing detailed images of significant landmarks and structures. Resolution in this case refers to the ground distance represented by a screen pixel. The resolution viewable depends upon the overall distance shown on the screen. In other words, if the viewable width of the image displayed on the screen is 3000 miles, the resolution would be about 2000 meters, at 500 miles the resolution improves to 300 meters, and so on.

A shortcoming in the current art is that such high resolution images, in digital form, require a large amount of computer-readable memory. An image is typically comprised of a plurality of "tiles" which include an image file (e.g., bmp, jpeg, or the like) of a portion of the image and a meta-data file which stores identifying information about the tile such as geographic coordinates and a sequence number to define its place in the overall image. As resolution increases, so does the number of tiles which are required to display and image. For example, a 2000 meter resolution image data may comprise twenty to thirty tiles. A 30 meter resolution image may consist of thousands of tiles. A high resolution image may consist of hundreds of thousands of tiles. Since each tile comprises about 256×256 bmps, memory required to store and display high resolution images, large memory capacity is required.

A typical one meter resolution image used in weather displays covers about a 60 to 100 square mile area and represents an uncompressed file size of about five gigabytes of storage space. This is roughly the limit of the area capable of being accessed and displayed because current display techniques often require reading the entire image before displaying any of it. If a different location is desired to be viewed, another five gigabyte file must be read.

Television stations typically serve a viewing area covering hundreds or thousands of square miles and either cannot store a significant number of files of high resolution images covering their entire viewing area, or cannot quickly display selected areas of images within their viewing areas to display relevant weather events. When an image is accessed for display, the tiles comprising are loaded for display sequentially according to the sequence number in the meta-data file. Since weather events occur over a large area, a plurality of threats may be imminent at any given point over the entire viewing area, but to show the high resolution images the various points would take a significant amount of crucial time to load and display the image. Moreover, weather events advance over ground in a manner that is likely inconsistent with the sequencing scheme of the tiles. Therefore, to track weather events across multiple non-sequentially related tiles, it is necessary for the system to remember the position of a first tile, then calculate its relationship to the next tile desired to be within the view which results in a cumbersome technique. Finally, when panning across an area, whole tiles must be dropped from view, and the new tiles added, again, sequentially. If the panning is not according to the tile sequence scheme, the access and loading time is lengthy.

Because of this limitation, the current art may access and display an image affected by a weather event occurring within the area represented by the image, but it fails to allow display of an image covering an area that is beyond the scope of the first image without significant processing time. Consequently, typical commercial weather information activities, such as television stations, only display high resolution images of densely populated areas. However, weather systems, for example, severe storms, often occur over larger geographic areas.

SUMMARY

A method for displaying weather-related symbology with high-resolution overhead photographic images of geographic areas comprises the steps of obtaining a high-resolution photographic image of a geographic area where the image comprises a plurality of tiles, and each of the tiles comprises a high-resolution image file and are assembled to form the image according to geographic coordinates, then accessing at least one tile where such tile comprises a high resolution image of a geographic sub-area, and then creating a composite image by combining weather-related symbology with the tile to create a composite image, where the weather-related symbology indicating a weather event relevant to said geographic sub-area.

A system for performing the method includes a processor readable memory configured with control logic which causes a computer system to execute the steps of the method.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE FIGURES

The present invention is described in association with the below-listed Figures. In the drawings, like reference numbers indicate identical or functionally similar elements. Additionally, the left-most digit(s) of a reference number identifies the drawing in which the reference number first appears.

FIG. 3A is a computer screen capture depicting use of a method according to one embodiment of the present invention;

FIG. 3B is a computer screen capture depicting use of a method according to one embodiment of the present invention;

FIG. 3C is a computer screen capture depicting use of a method according to one embodiment of the present invention;

FIG. 4 is a functional diagram of a computer system for implementing a method according to an embodiment of the present invention;

DETAILED DESCRIPTION

The various embodiments of the present invention and their advantages are best understood by referring to FIGS. 1 through 5C of the drawings. The elements of the drawings are not necessarily to scale, emphasis instead being placed upon clearly illustrating the principles of the invention. Throughout the drawings, like numerals are used for like and corresponding parts of the various drawings.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

All embodiments disclosed below may be provided in other specific forms and embodiments without departing from the essential characteristics as described herein. The embodiments described below are to be considered in all aspects as illustrative only and not restrictive in any manner. The appended claims rather than the following description indicate the scope of the invention.

Figure 1:
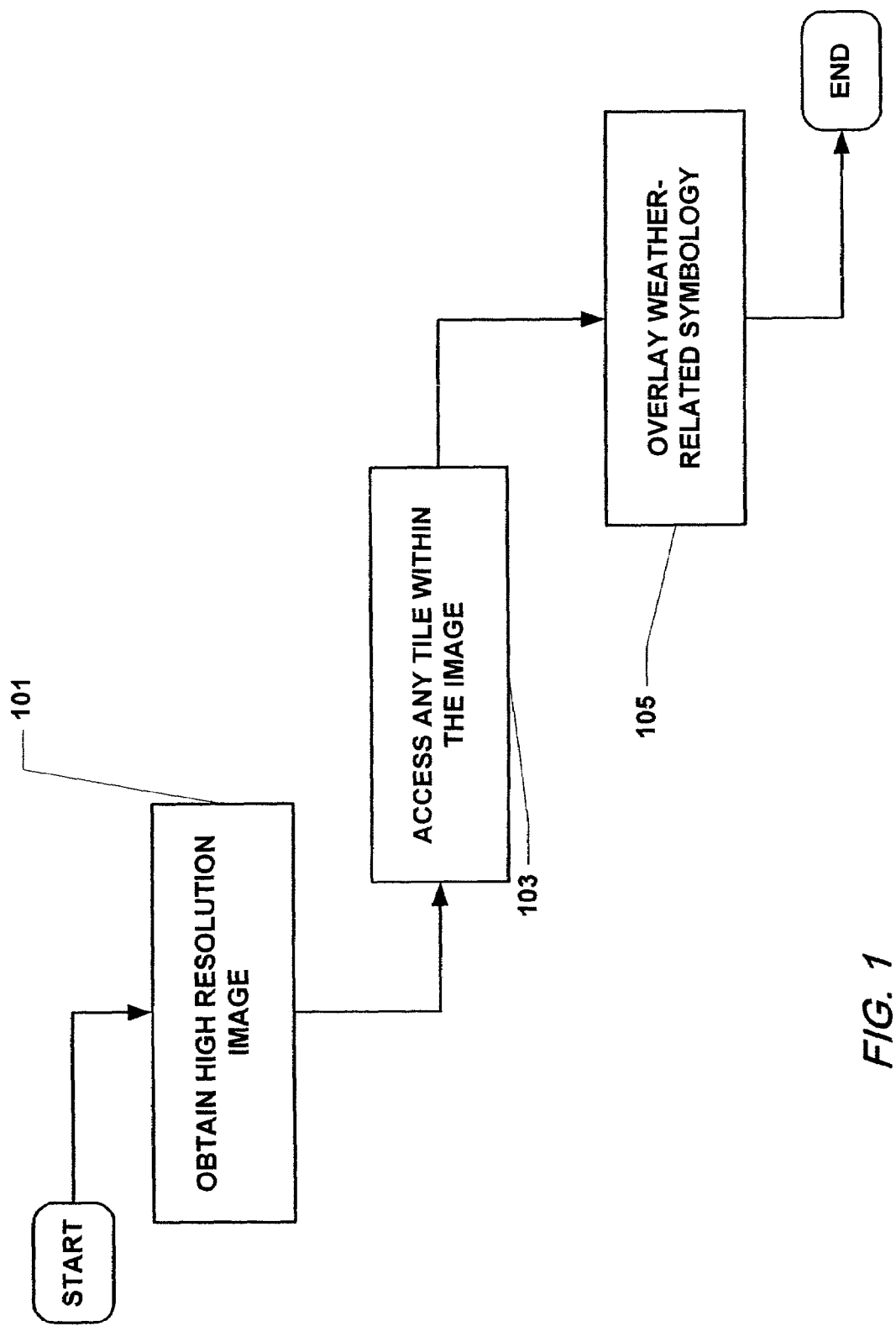
FIG. 1 is a flowchart depicting a method according to one embodiment of the present invention.

FIG. 1 displays steps according to one embodiment. First, a high resolution image of a geographic area is obtained 101, and a portion of the image, represented by a tile described in detail below, is accessed 103, where the tile represents a geographic sub-area. A symbol indicating a weather event is then overlaid upon the tile 105. High resolution, in this instance, is deemed to include resolutions of five meters or less, meaning that a display pixel used in typical digital image display electronics hardware would correspond to a geographic area of five square meters. A resolution of one meter or better is preferred. Those skilled in the relevant arts with the benefit of reading this disclosure will appreciate that higher resolutions may be used assuming adequate processing and display capability are provided.

The high-resolution image is a set of one or more electronic image tiles that are comprised of a high resolution image file of a portion of the geographic area and a meta data file. The meta data tile includes identification, position and possibly descriptive information about the image file. Specifically, meta data associated with each tile includes the geographic coordinates mapped to the image. Meta data may also store other information regarding the image, such as the type of projection, i.e., Mercator, UTM, or Lambert conformal, or other projection techniques. Each of the files may be a compressed file which has been compressed using an algorithm that results in a high compression rate. A non-limiting example of such an algorithm is the well-known wavelet compression algorithm. A high compression rate is one that results in a compressed file size that is about 10% or less of the original file size. The compressed file also typically includes meta-data which enables access to any portion of the file based upon coordinates, usually geo-referenced coordinates. The high compression ratio allows the storage, reading and display of images of large uncompressed file size, e.g., greater that 5 gigabytes. One form of wavelet compression suitable for use in the present invention is the JPEG 2000 standard.

Image tiles are associated with a data structure that permits loading and displaying of tiles. For example, a data structure may be constructed in the form a two-dimensional array, the cells of which contain, or reference, the tile meta data. The array may be populated according to geographic coordinates by constructively placing tiles in the data structure according to the corresponding geographic coordinates represented by the constituent tile images. Control logic, defined below, is then implemented to enable selection of a tile based upon geographic coordinates, the opening and display of that tile, and the opening and display of a group of tiles surrounding the selected tile, if desired. The geographic coordinates may be those that represent a point that is within an area that is affected by a weather event, called the relevant area. When geographic coordinates are entered, either through manual or automatic input, the array is searched to determine which cell includes the input geographic coordinates and that tile is displayed. The number of tiles opened in the group may be according to a user-defined limit, or may be the limit of the tiles able to be displayed by system display.

To increase the speed with which an image may be displayed, the data structure may be a two-dimensional data structure that is a sub-array of a larger two-dimensional array, where each cell in the sub-array comprises a tile. For example, a large array, referred to for clarity purposes as Array Large, is a two-dimensional array where each of the cells is a two-dimensional sub-array, herein called Sub-Array (n) that represents an area that includes at least one set of geographic coordinates. Each cell in Sub-Array(n) contains a tile, or the reference to a tile provided by that tile's meta data, and represents a sub-area that includes at least one set of geographic coordinates. When a geographic reference point is entered for an area to be displayed, control logic executes a test of each Sub-Array(n) to determine whether the reference point is within the geographic coordinates included in the sub-area represented by the Sub Array. If so, then the entire group of tiles within the selected Sub-Array(n) are loaded and displayed. This enables the ability to quickly cull the tiles that are not needed to be displayed, and to locate and display tiles that are relevant.

It will be apparent to those skilled in the arts that other embodiments may be implemented wherein a sub-array may be further divided such that each cell is comprised of a second sub-array, each cell is populated with tile information and defines a second sub-area that includes a geographic coordinate. Alternatively, the cells in the second sub-array could be divided into a third sub-array, and so on depending upon the size of the image, the magnification desired, and the number of tiles that comprise the image.

An image may comprise many tiles and display capacity may be limited to a finite number of tiles. It may be desired to "pan," i.e., shift the image to view another geographic sub-area. In that case, the tiles are removed that no longer need to be displayed and tiles comprising the images of the new geographic sub-area are accessed and displayed in the manner described above. The determination as to which tiles are to be removed and which tiles are to be displayed will be based upon the input of geographic coordinates located in the direction of the shift. In other words, when a shift is commanded, either manually, or executed with control logic, geographic coordinates within in the next cell of the array, sub-array, etc., in direction of the shift are input, and the cell is accessed and the tile or tiles associated with that cell are loaded for display.

In another embodiment, an application that can be adapted to structure the tiles and access them in a technique similar that described in the preceding paragraphs is available under the name "ECW JPEG 2000 Software Development Kit" from ER Mapper which is headquartered at 2 Abbotsford Street, West Leederville Wash. 6007, Australia. This application is able to compress large imagery files, on the order of 50 Terabytes (50,000 Gigabytes) by 95% or greater making such files much easier to store, and manipulate. In addition, it permits a rapid selection of image tiles, and groups of image tiles for display.

Once the high resolution image is obtained and a portion selected, and accessed, weather event symbology is overlaid upon this image creating a high resolution weather event display. One non-limiting example of weather event symbology that can be used is known as Storm Cell Identification and Tracking or "SCIT". SCIT symbology has been used by the National Weather Service to indicate near real-time position and predicted direction of a storm cell. SCITs were also described and used in the co-owned U.S. Pat. No. 6,670,908 to Wilson, et al, entitled "Automated System and Method for Processing Meteorological Data", issued Dec. 30, 2003, incorporated herein by reference, and provides among other information a graphical representation of threat location and forecasted movement related to a geographic area based upon a variety of weather data from a variety of sources. The SCIT includes a reference point indicating the geographic location of a storm cell, and, extending therefrom, a vector indicating the predicted direction of storm movement and the speed of advance. A fan encompasses the point and vector arrow to, show a margin in which the storm might move or otherwise affect.

Display symbols include geographic locations within the storms path, represented by the vector arrow, and within the fan. The SCIT is geo-referenced, meaning that the points comprising the symbols are associated with geographic coordinates, usually latitude and longitude or equivalents. Weather events represented by the symbology include, but are not limited to, thunderstorms, cyclonic activity and wind shear, or the like.

Symbology is overlaid onto the high resolution image by mapping corresponding geographic coordinates forming a composite image. In other words the coordinates that are comprised in the symbology are mapped to their corresponding coordinates comprised in the high resolution image. Thus, a high resolution image may be displayed along with the weather event symbology, so that locations, including buildings, such as schools, hospitals, government facilities, and the like, or other significant locations, are shown in detail, and how they may be affected by the weather event. It should be noted that city/town names, building names, street names, and labels of other landmarks may be incorporated into the display.

Accessing the image for display may be performed by manually inputting site-identifying data, such as place name, address, latitude and longitude, or other geographic reference. The image may also be accessed through the use of a GUI whereby a user manipulates a cursor or pointer and indicates a point, or an area, on the display corresponding to coordinates comprised within a composite image. The composite image may then be displayed.

A computer processing system, described below, may be used to automatically execute the method described above for creating and displaying the composite image where the computer processing system is configured to access the image, overlay weather-related symbology thereon and display the resulting composite image. Similarly, it may then access a second composite image and display that image, and so forth. The second image may be an image slightly shifted geographically (or "panned") with respect to the first image. Alternatively, it could be a composite image of another geographic area.

For example, a report of a weather event's effect upon an area may include displaying the high resolution image overlaid with the point location of the event for a period of time. Since the vector is a representation of the storm's speed of advance, points along the arrow may be accessed using the methods described herein and viewed based upon time. Then, advancing in time, along the vector arrow some time interval, a geographic point that will be affected some time in the future may be displayed in high resolution, and so on to the terminus of the vector, panning the composite image from the start of the vector to the terminus in the manner described above. Additionally, where there are multiple weather events occurring in a particular area, each composite image portion associated with a weather event may be accessed and displayed, preferably automatically, based upon a priority scheme.

Figure 3E:
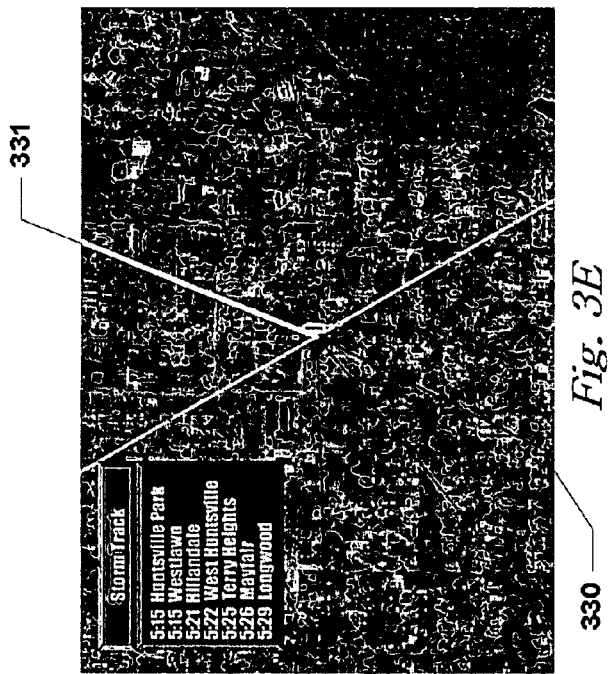
FIG. 3E is a computer screen capture depicting use of a method according to one embodiment of the present invention.

FIGS. 3A through 3E are screen captures of a computer display showing use of the composite images. FIG. 3A depicts a composite image 300 where weather event symbology 302 is overlaid on an image displayed at a magnification such that only area topography is discernable.

FIG. 3B shows a composite image 305 of weather symbology 307 overlaying a high resolution image of an area. Perceived magnification of the image is increased so that the imagery of the geographic area of interest is discernable. FIG. 3C is a magnified view of a composite image 310 the reference point 313 of the weather event symbology overlaid upon a high resolution image. This would depict the latest position of the weather event. At this magnification, significant landmarks are discernable.

Figure 3D:
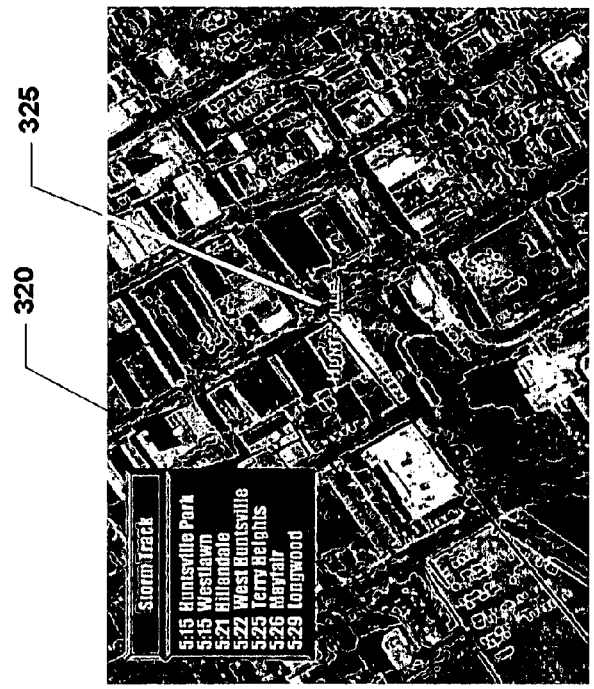
FIG. 3D is a computer screen capture depicting use of a method according to one embodiment of the present invention.

FIG. 3D is a screen capture of a composite image 320 comprising a high resolution image overlaid with the weather symbology 325 and presenting some time interval in the future from the current position depicted in FIG. 3C. Again, at this magnification, prominent buildings may be distinguished. The line 325 through the image is the vector arrow, originating at the reference point shown in FIG. 3C, representing the predicted path of the weather event. In a further embodiment the prominent buildings, for example, the county courthouse, city hall, and any medical facilities or schools in the path may be labeled to show where the weather event is, or will be, in relation to that building. FIG. 3E is a composite image 330 depicting the termination of the vector arrow 331 overlaid on the high resolution imagery of the area affected by the weather event.

It should be noted that the various images, although geographically referenced, may be of varying projections. Therefore, it is necessary to resolve all of the component image products to a consistent projection for the composite display.

Figure 2:
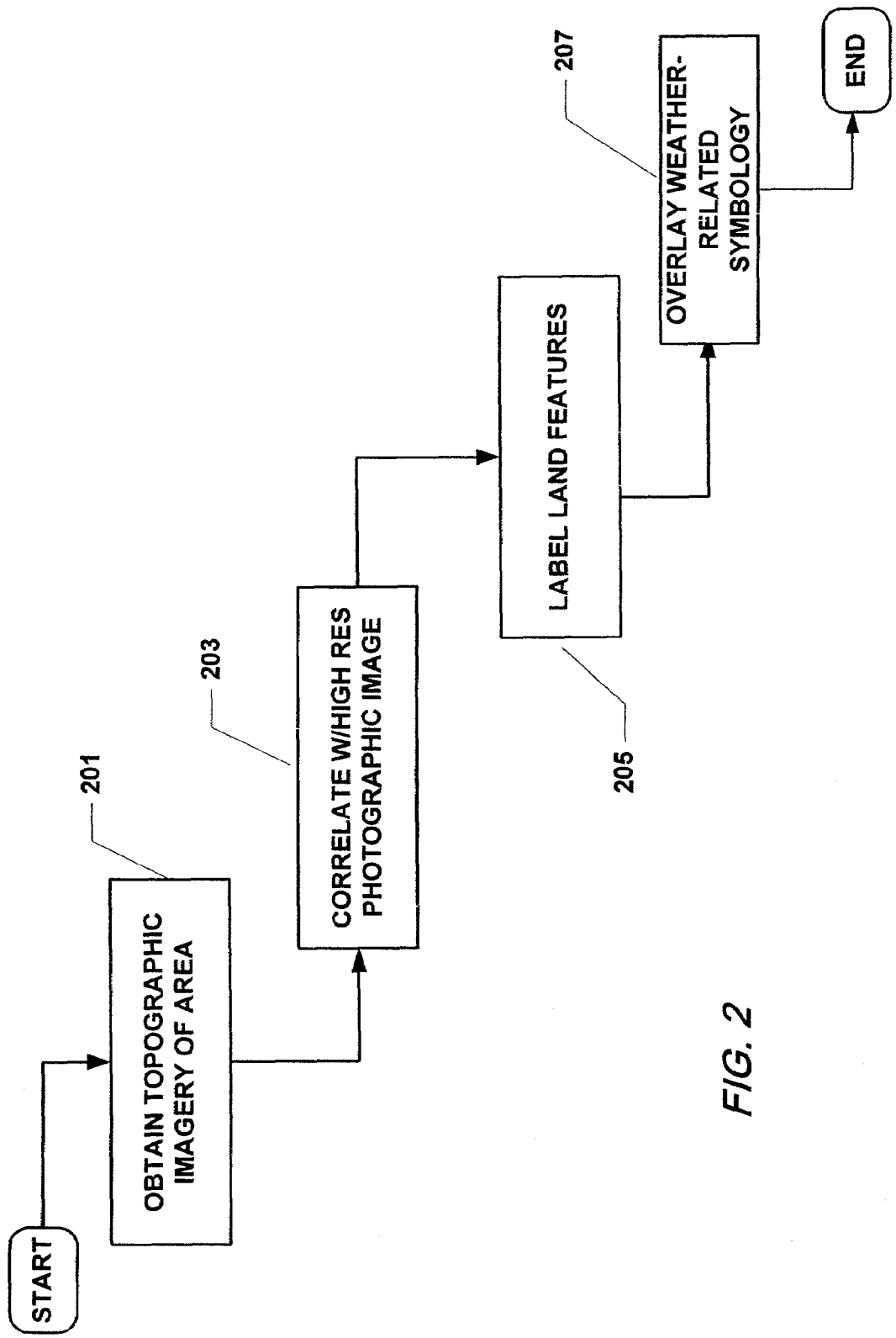
FIG. 2 is a flowchart depicting a method according to another embodiment of the present invention.

In another embodiment, the composite image is processed according to the steps shown in FIG. 2. A file representing a graphic of topographic imagery of the area of interest is obtained 201. This is correlated with a high resolution photographic image of the same area based upon corresponding geographic references 203. Roads, political boundaries, place names, communities and certain buildings are labeled 205. Finally, weather symbology is overlaid upon this image to form the final composite image 207. Optionally, radar imagery may be incorporated into the image as well.

A system 400 for implementing the above described processes is shown in FIG. 4. Source data for the composite image arrives from a source for high resolution photographic geographic imagery 410, a radar data source 420, a NEXRAD weather data source 430, and a source of other weather data 440. The various source data are input into a computer system 450 which is comprised of a processor 452 and a processor readable storage device, or memory 454. Memory 454 may be configured to store a database 456, and associated control logic which configures computer system 450 to perform the steps in the inventive process. The various image products are output to display 460. Optionally, the image products may be output to a distribution system 470 for distributing the image products to remote displays (not shown) either wirelessly, over land lines or both. Database may store, among other things, place names associated with geographic references, road labels, political boundary position information, and the like.

A computer system 450 could include, for example, one or more processors 452 that are connected to a communication bus. Memory 454 may also include a main memory, preferably a random access memory (RAM), and can also include a secondary memory. The secondary memory can include, for example, a hard disk drive and/or a removable storage drive. The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a processor readable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a transceiver.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention could be implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As described above and shown or described in the associated illustrative files, the present application discloses a method for displaying weather-related symbols on high-resolution images and computer system for execution thereof.

As discussed above, one particular example of weather event symbology that can be displayed is a SCIT. A SCIT normally includes a reference point indicating the geographic location of a storm cell (in real time, or near real time), and a vector, extending therefrom, indicating the predicted direction of storm movement and speed of advance. In this context, a SCIT is referred to as any predicted "storm track," or "storm path," including but not limited to storm tracks manually created, based on the National Weather Service data, or described in U.S. Pat. No. 6,670,908, previously incorporated herein by reference. The system may also generate a fan, or boundary area, using methods well known in the art, that encompasses the reference point and vector to show an area in which the storm may move or otherwise affect. Unfortunately, in order to show a full storm track showing predicted position in the future, the system view has to "zoom out" to a relatively large geographic area. As best understood with respect to FIG. 2A, as the size of the geographic area depicted increases, the level of detail of the geographic area decreases. For example, as shown in FIG. 2A, only major highways and county lines are depicted. Even when the system "zooms in", but still displays the entire storm track (see FIG. 3B), details of the geographic area affected by the storm track are still not readily discernible. With less detail, for example, lack of local streets and landmarks, the viewers may still have a difficult time appreciating the danger represented by the storm, and whether it will affect their specific location.

Thus, to overcome this limitation, the present invention allows a user to automatically pan over the storm track in a "zoomed-in" display, i.e., view a "fly-by" of the storm track vector advancing in time. As depicted in successive images FIGS. 3C, 3D and 3E, the system allows the user to "travel" along the storm track from the latest, or most current position (FIG. 3C) to the termination of the storm track (FIG. 3E), i.e., follow the storm track advancing in time. As depicted in these figures, the system can be configured to zoom in to view only small portions of the overall storm track at any one time, enabling the localized buildings, schools, city streets, landmarks, and the like to become more perceptible and understandable.

As depicted in FIGS. 3C, 3D, and 3E, and as discussed above, because the storm track vector is a representation of the storm's speed of advance, the estimated arrival times of the weather event at a particular location can be displayed as the system pans over the storm track. In one embodiment, as depicted in FIGS. 5A, 5B, and 5C, the time of arrival at a particular location on the storm track is displayed on the storm track itself, or in close proximity thereto, as the system pans through that point along the storm track (i.e., during the "fly-by").

Figure 5A:
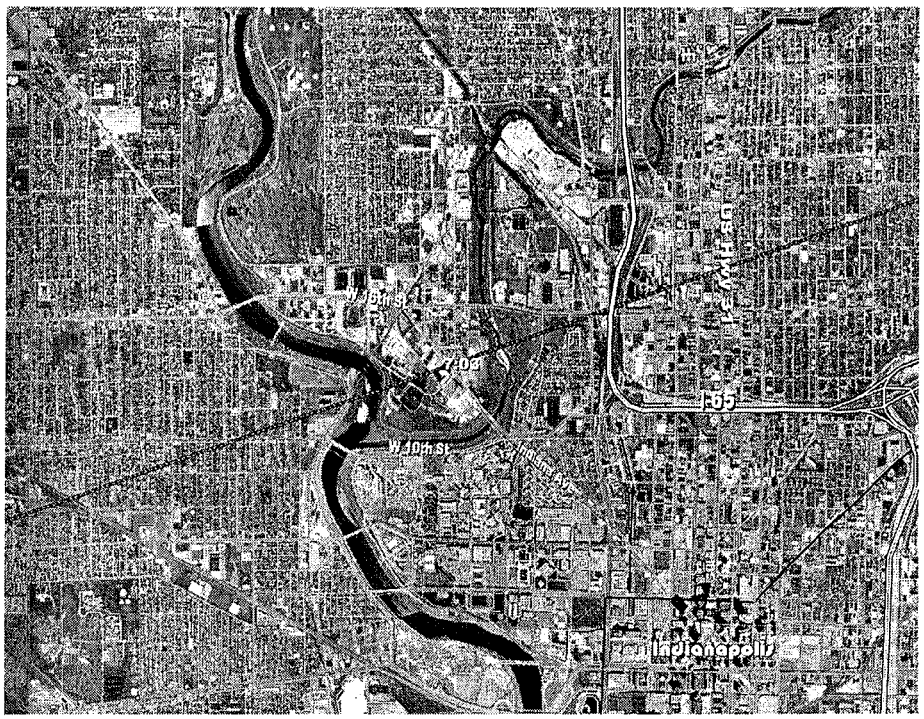
FIG. 5A is a computer screen capture depicting use of a method according to one embodiment of the present invention.
Figure 5B:
FIG. 5B is a computer screen capture depicting use of a method according to one embodiment of the present invention.
Figure 5C:
FIG. 5C is a computer screen capture depicting use of a method according to one embodiment of the present invention.

FIG. 5A depicts a portion of a storm track near Indianapolis, Ind., and the expected location of a storm at 7:03. FIGS. 5B and 5C depict successive screen shots as the system pans through the storm track, and the expected location of the storm at 7:08 and 7:13, respectively. As can be appreciated, the system can display a running clock and/or a visual indicator on the storm track so the expected location of the storm can be constantly displayed as the system pans over the entire storm track.

For example, if the current time is 6:58 and the current location of the storm is displayed, as the system pans over the expected storm track, the clock will run as the storm track is followed to its expected future positions, i.e., the expected location at 6:59, 7:00, 7:01, etc. The system can also be configured to display the arrival times in seconds.

As depicted in FIG. 3B, and FIGS. 5A, 5B and 5C, and as discussed above, roads, political boundaries, place-names, communities, and buildings (for example, schools, hospitals, and government buildings) can be labeled and displayed. The system may be configured to automatically display these landmarks, or display them upon some user input, for example, a user clicking on a street to display the name using a manual input device, for example a computer mouse.

In one embodiment, as the system pans along the storm track, roads, political boundaries, place-names, communities, and buildings in close proximity to the storm track will be automatically displayed, for example, displaying roads names when the storm track crosses a particular road, or displaying a building name when the storm track is within some default distance, for example, 0.25 miles. The system may also be configured to pause at certain intervals (for example, every five minutes) or at certain locations (for example, when a road name or other landmark name is displayed) while it pans over the storm track. As discussed above, radar imagery may be incorporated into the display as well.

While the preferred embodiment includes display of high resolution images in connection with the storm track display, other topographic imagery of an area of interest can also be used. In this alternative embodiment, the topographic imagery map simply displays the traditional roads, political boundaries, rivers/lakes, and the like, but without the high resolution photographic images. The panning over the storm track, advancing in time, is substantially the same, with only the underlying geographical display being different.

While particular embodiments of the invention have been described, it will be understood, however, that the invention is not limited thereto, since modifications may be made by those skilled in the art, particularly in light of the foregoing teachings. It will be, therefore, contemplated by any claims in an ensuing non-provisional application claiming priority to this document to cover any such modifications that incorporate those features or those improvements that embody the spirit and scope of the present invention.

We claim:

1. A system for tracking storms comprising:
   a. memory for storing topographical imagery for a geographical area; and
   b. logic configured to receive meteorological data related to storms in the geographic area, process the meteorological data to define at least one storm path vector and at least one associated boundary area that a storm in the geographic area may affect, create a composite image by combining the topographical imagery, storm path vector, and associated boundary area, and display the storm path vector beginning at its current geographic location and, advancing in time, while displaying an arrival time indicator, panning to the end of the vector, wherein only a portion of the storm path vector is displayed at any point in time.

2. The system of claim 1, wherein the topographical imagery comprises one or more high-resolution photographic images.

3. An apparatus for displaying the projected movement of a storm with high-resolution overhead photographic images of a geographic area wherein the system comprises a software or firmware encoded on tangible media operated on by a processor, said processor being programmed to perform the steps of:
   a. obtaining the geographic location, predicted direction of movement, and predicted speed of advance of a storm;
   b. generating a storm path vector from the storm's current geographic location, predicted direction of movement, and predicted speed of advance;
   c. creating one or more composite images by combining the storm path vector with one or more high-resolution photographic images of a geographical area; and
   d. displaying the one or more composite images by panning along the storm path vector advancing in time toward an expected future position of the storm, while displaying an arrival time indicator communicating the estimated arrival of the storm at a particular location, wherein only a portion of the storm path vector is displayed at any point in time.

4. The apparatus of claim 3 further comprising the step of generating a boundary area that the storm may affect during some future time interval and wherein the step of creating one or more composite images by combining the storm path vector with one or more high-resolution photographic images of a geographical area further includes combining the boundary area.

5. The apparatus of claim 3, wherein said one or more composite images includes the names of geographic landmarks.

6. The apparatus of claim 3, wherein one or more geographic landmark names are automatically displayed during the displaying step when the expected future position of the storm is near the geographic landmark.

7. An apparatus for tracking a projected path of a storm wherein the system comprises a software or firmware encoded on tangible media operated on by a processor, said processor being programmed to perform the steps of:
   a. obtaining a geographic location, direction of movement, and speed of advance of a storm;
   b. generating a projected storm path from the storm's geographical location, direction of movement, and speed of advance;
   c. creating one or more composite images by combining the projected storm path and topographic imagery;
   d. displaying such composite image wherein the displaying step of the one or more composite images comprises panning along the projected storm path advancing in time toward an expected future position of the storm, while displaying an arrival time indicator communicating the estimated arrival of the storm at a particular location, wherein only a portion of the projected storm path is displayed at any point in time.

8. The apparatus of claim 7 wherein the topographic imagery comprises one or more high-resolution photographic images.

* * * * *